United States Patent [19]
Aoki et al.

[11] Patent Number: 5,378,339
[45] Date of Patent: Jan. 3, 1995

[54] WATER ELECTROLYZER

[75] Inventors: Kazuaki Aoki; Tomio Tadokoro; Shozo Miyazawa, all of Suzaka, Japan

[73] Assignee: Techno Excel Kabushiki Kaisha, Nagano, Japan

[21] Appl. No.: 94,044

[22] PCT Filed: Jan. 21, 1993

[86] PCT No.: PCT/JP93/00084

§ 371 Date: Aug. 2, 1993

§ 102(e) Date: Aug. 2, 1993

[87] PCT Pub. No.: WO93/15022

PCT Pub. Date: Aug. 5, 1993

[30] Foreign Application Priority Data

Jan. 30, 1992 [JP] Japan .................. 4-040183
Feb. 12, 1992 [JP] Japan .................. 4-058916

[51] Int. Cl.⁶ .................. C25B 9/00; C25B 15/08; C25B 11/10
[52] U.S. Cl. .................. 204/260; 204/263; 204/290 F
[58] Field of Search .................. 204/257, 260, 290 F, 204/263–266, 255

[56] References Cited

U.S. PATENT DOCUMENTS

| 3,801,488 | 4/1974 | Okuhara et al. | 204/260 X |
| 3,984,303 | 10/1976 | Peters et al. | 204/260 |
| 4,169,035 | 9/1979 | Stummer et al. | 204/260 |
| 4,426,261 | 1/1984 | Fushihara | 204/260 X |

FOREIGN PATENT DOCUMENTS

| 60-20073 | 3/1978 | Japan . | |
| 62-102890 | 5/1987 | Japan . | |
| 1-262985 | 10/1989 | Japan . | |
| 1710519 | 2/1992 | U.S.S.R. | 204/260 |
| WO93/15022 | 1/1993 | WIPO . | |

Primary Examiner—Donald R. Valentine

[57] ABSTRACT

An object of the present invention is to provide a water electrolyzer, which has higher electrolyzing efficiency and smaller size than conventional ones. In an electrolyzing tank, at least three cylindrical electrodes, each of which has different polarity with respect to adjacent one, are arranged concentrically with cylindrical partitions. Surface area of the one cylindrical electrode, which is provided between other two, is equal to the sum of surface area of an outer face of the inner cylindrical electrode and that of an inner face of the outer cylindrical electrodes, so that maximum electrolyzing efficiency can be gained.

8 Claims, 8 Drawing Sheets

WATER ELECTROLYZER

FIELD OF TECHNOLOGY

The present invention relates to a water electrolyzer, and more precisely relates to a water electrolyzer, which comprises an electrolyzing tank, electrodes, which are mutually faced in the electrolyzing tank, and a porous partition provided between the electrodes, whereby alkali water is introduced from a cathode electrode.

BACKGROUND OF TECHNOLOGY

A conventional water electrolyzer, which electrolyzes raw water in an electrolyzing tank to alkali water and acid water by supplying electric power to electrodes in the electrolyzing tank, has been known. An example is disclosed in the Japanese Patent Publication No. 60-20073.

The water electrolyzer disclosed in the Japanese Patents has an electrolyzing tank whose inner space is divided into a cathode chamber and an anode chamber by a porous partition, and there is provided a rod-like electrode in each chamber so as to electrolyte raw water.

In the water electrolyzer, alkali water having higher pH value is electrolyzed in the cathode chamber when electric power is supplied to the rod-like electrodes.

However, it is impossible for the conventional rod-like electrodes to broaden surface area for electrolyzing raw water, so that the electrolyzing tank and the water electrolyzer including it must be larger.

Furthermore, the rod-like electrodes, which if used for a long time, are necessary to be replaced. Being a larger electrolyzing tank, it cannnot be replaced entirely, so the rod-like electrodes are replaced.

However, replacing only the rod-like electrodes is a complicated task, and maintenance work is difficult.

SUMMARY OF THE INVENTION

An object of the present invention is to provide a water electrolyzer having higher electrolyzing efficiency than conventional water electrolyzers and being capable of compacting an electrolyzing tank in size.

Another object of the present invention is to provide a water electrolyze being capable of easily exchanging the compacted electrolyzing tank.

To achieve the object, the inventors of the present invention have found that: the surface area of the electrodes can be made broader by forming the electrodes into concentric cylinders, and the electrolyzing efficiency can be increased; and exchanging the electrolyzing tank can be easy by arranging an inlet for raw water, outlets for alkali and acid water and through-holes, through which said terminals pass, on same face of the electrolyzing tank.

The water electrolyzer of the present invention has the following structure: an electrolyzing tank, electrodes, which are mutually faced in the electrolyzing tank, and a porous partition provided between the electrodes, whereby alkali water is introduced from cathode electrodes; the electrodes are a first cylindrical electrode, a second cylindrical electrode which is concentrically arranged outside of the first cylindrical electrode, and a third cylindrical electrode which is concentrically arranged outside of the second cylindrical electrode; one of the adjacent cylindrical electrodes is a cathode and the other is an anode; and the surface area of the second cylindrical electrode is equal to the sum of surface area of the outer face of the first cylindrical electrode and the surface area of inner face of the third cylindrical electrodes.

The water electrolyzer of the present invention also has the following structure: an electrolyzing tank, electrodes, which are mutually faced in the electrolyzing tank, and a porous partition provided between the electrodes, whereby alkali water is introduced from a cathode of the electrodes; the electrodes are three cylindrical electrodes, which are concentrically arranged, one of the adjacent cylindrical electrodes is a cathode and another is an anode, each cylindrical electrode has a terminal on one end face, the partition is a cylindrical partition and is concetrically arranged between adjacent cylindrical electrodes; a branching plate for branching alkali water, which is formed on the cathode side, and acid water, which is formed on the anode side, to predetermined paths contacts the other end faces of the cylindrical electrodes with a packing made of an elastic material; and the electrolyzing tank has a tank casing, which is capable of accommodating the cylindrical electrodes, the cylindrical partitions and the branching plate, the tank casing has outlets for the alkali water and acid water, an inlet for raw water and through-holes, through which the terminals pass, on the same face, the electrolyzing tank is detachably attached.

In the above stated structures, if the first and third electrodes are cathodes and the second electrode is an anode, and/or the anode is made of titanium (Ti) and coated with platinum (Pt), the life spans of the electrodes can be longer.

The branching plate has groove paths, which are connected to the paths, through which the alkali water and acid water pass, on faces, which contact the tank casing and the packing, so the alkali water and the acid water can be easily branched.

Furthermore, the outlets for the alkali water and acid water, the inlet for raw water and the through-holes, through which the terminals pass, are formed on a bottom face of the electrolyzing tank, so the electrolyzing tank can be easily replaced.

In the present invention, at least three cylindrical electrodes are concentrically arranged, so that the surface area of the electrodes, which contact water, can be broader and the electrolyzing efficiency can be increased. Thus, the electrodes and the electrolyzing tank can be compacted in size.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

The present invention will now be described in detail with reference to the accompanying drawings.

Figure 1:
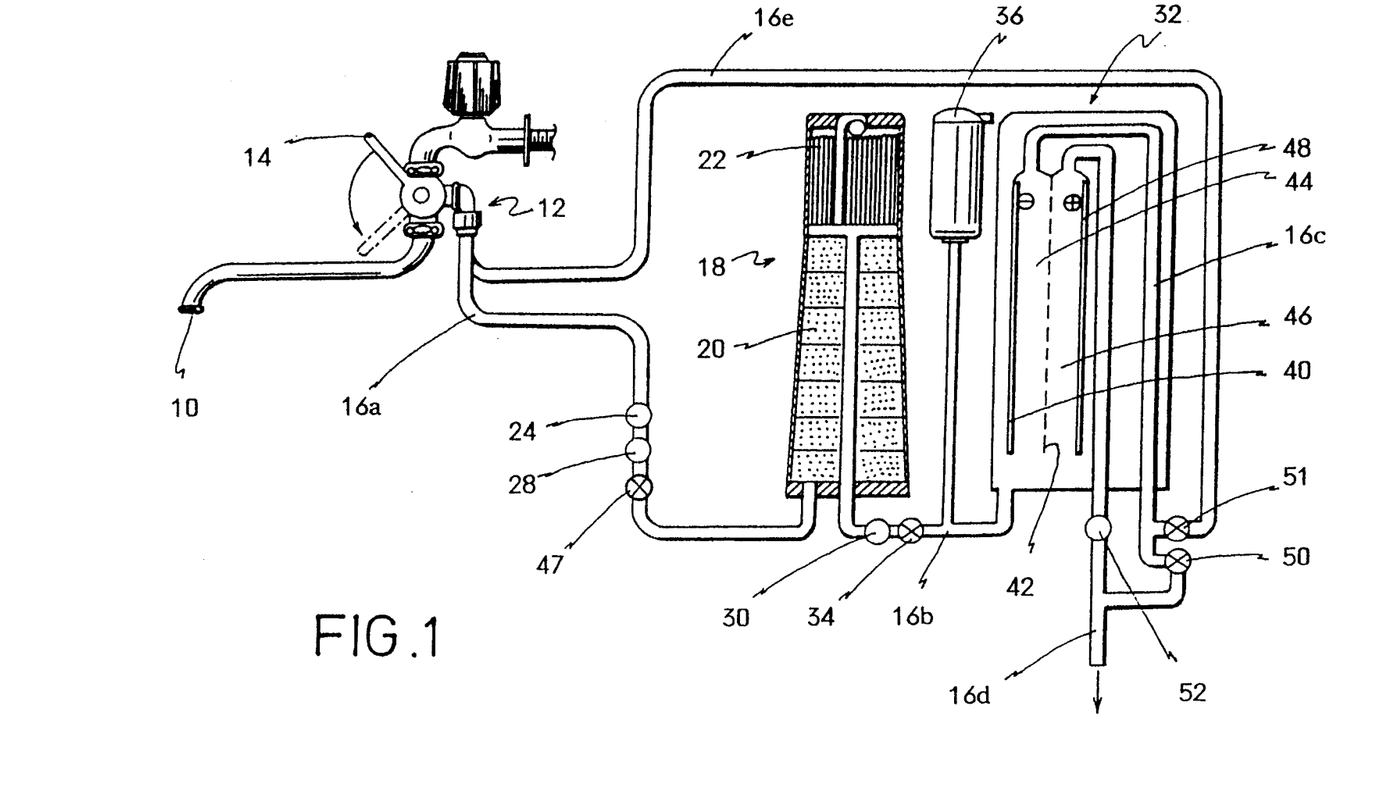
FIG. 1 is an explanation view showing a summary system of a water electrolyzer.

FIG. 1 shows a schematic explanation view showing a summary system of a water electrolyzer of the present embodiment.

In FIG. 1, raw water or alkali water is selectively spouted from a faucet 10. Raw water or alkali water is selected by turning a selection lever 14, which is provided to a selector 12. When the selection lever 14 is turned to a raw water position, raw water, which is supplied via a water pipe (not shown), directly spouts from the faucet 10.

On the other hand, when the selection lever 14 is turned to an alkali water position, raw water supplied via the water pipe (not shown), is introduced from the selector 12 to a purifying section 18 via a pipe 16a.

Raw water introduced into the purifying section 18 passes through an activated charcoal cartridge 20 and a hollow fiber filter 22, so that impurities, chlorine, etc. in the raw water are adsorbed and filtered by them, and filtered water is introduced out from a pipe 16b.

Note that, all of chlorine, etc. in the raw water is not filtered; a part of that will be included in the purified water.

A first thermosensor 24 is provided at the pipe 16a. The first thermosensor 24 is, for example, a thermister, and detects water temperature in the pipe 16a so as to prevent water therein from freezing, and prevent hot raw water from flowing into the purifying section 18 and deteriorating the activated charcoal in the cartridge 20.

To prevent freezing, for example, if the first thermosensor 24 detects cold raw water, whose temperature is lower than 5° C., AC voltage is inputted to electrodes in an electrolyzing tank so as to warm water therein. On the other hand, if hot raw water, whose temperature is higher than 35° C., is detected, a first electromagnetic valve 47 closes the pipe 16a.

Note that, the first thermosensor 24 is provided for detecting temperature of the raw water flowing into, so the position thereof is not limited to the position shown in FIG. 1.

A first water pressure sensor 28 for detecting pressure of the raw water introduced into the pipe 16a is provided in the pipe 16a. A water meter for detecting flow quantity of the raw water may be used instead of the first water pressure sensor 28.

A mineral adding section 36 add some mineral, e.g., calcium, to raw water (purified water) in the pipe 16b, which flows into the electrolyzing tank 32.

There is provided a second water pressure sensor 30 and a regulator 34 in the pipe 16b, and the second water pressure sensor 30 detects pressure of the purified water flowing into the electrolyzing tank 32. Choking degree of the purifying section 18 can be detected by comparing the water pressure in the pipe 16b, which is detected by the second water pressure sensor 30, and the water pressure in the pipe 16a, which is detected by the first water pressure sensor 28.

Note that, a water meter for detecting flow quantity of the purified water may be used instead of the second water pressure sensor 30.

The regulator 34 defines the maximum quantity (or pressure) of water flowing into the electrolyzing tank 32.

The purified water in the electrolyzing tank 32 is electrolyzed by the cathode electrode 40 and the anode electrode 48, which are arranged to face each other, and a porous partition is provided therebetween, so that alkali water is produced in a cathode chamber 44 in which the cathode 40 is provided; acid water is produced in an anode chamber 46 in which the anode 48 is provided.

The alkali water produced in the cathode chamber 44 is introduced out from the electrolyzing tank 32 to the faucet 10 via pipes 16c and 16e and the selector 12.

on the other hand, the acid water produced in the anode chamber 46 is introduced out via a pipe 16d for further objects.

The front end of the pipe 16c is connected to the pipe 16d, a second electromagnetic valve 51 is provided at a junction to the pipe 16e, and a third electromagnetic valve 50 is provided on downstream side of the junction to the pipe 16e.

When the second electromagnetic valve 51 is opened and the third electromagnetic valve 50 is closed, the alkali water is introduced to the faucet 10 via the pipe 16e.

On the other hand, when the second electromagnetic valve 51 is closed and the third electromagnetic valve 50 is opened, the alkali water is discharged via the pipe 16d.

For example, to discharge leftover water in the electrolyzing tank 32 when the water electrolyzer is reused after a long time stoppage, or to mix the alkali water and the acid water, the valves are controlled as described above.

The alkali water is discharged, so as to, for example, discharge left-over water in the cathode chamber 44 and the anode chamber 46 before reuse of the water electrolyzer, or so as to mix the alkali water and the acid water.

Note that, in the case of mixing the alkali water and the acid water, the amount of the acid water can be adjusted by the adjusting screw 52 in the pipe 16d. Note that, a summary system of the electrolyzing tank 32, etc.

has been explained with reference to FIG. 1, so detailed structure of the electrolyzing tank 32 is omitted.

Figure 2A:
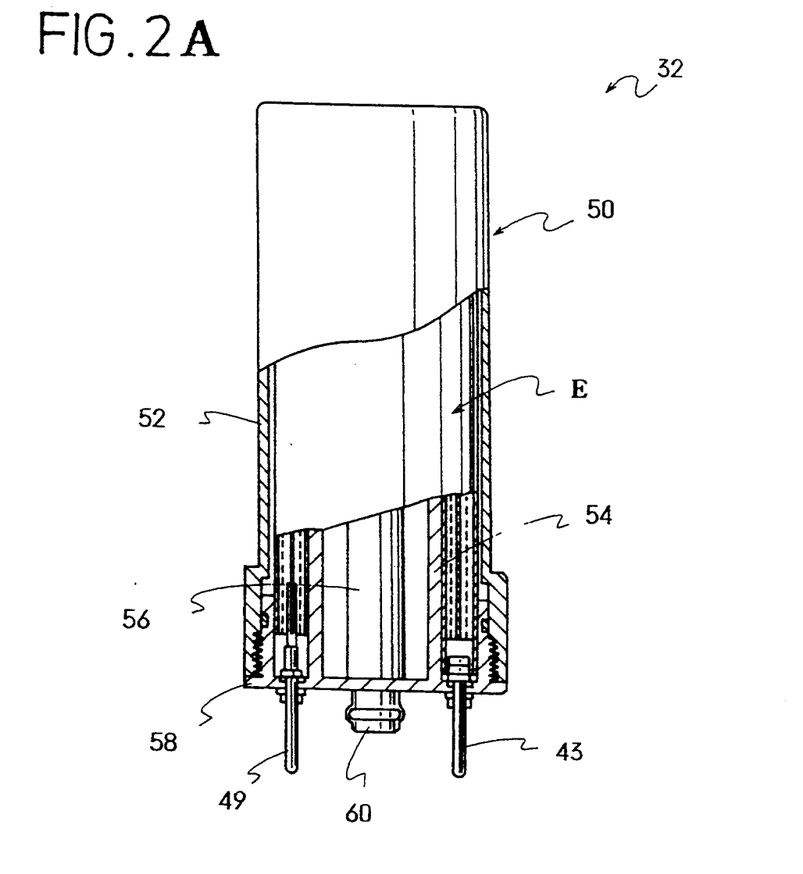
FIG. 2A is a partially sectional front view of the electrolyzing tank 32 shown in FIG. 1.

The electrolyzing tank 32 shown in FIG. 1 has, as shown in FIG. 2A, a cylindrical tank casing 50 and electrodes E, which has a cathode terminal 43 and an anode terminal 49 on an end face, inserted therein. The tank casing 50 has an upper casing section 52 and a lower casing section 58, which are mutually screwed together.

Figure 2B:
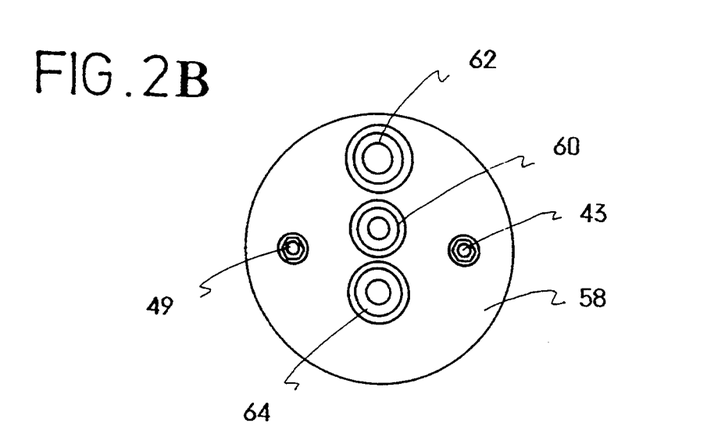
FIG. 2B is a bottom view of the electrolyzing tank 32 shown in FIG. 1.

The lower casing section 58 has, as shown in FIGS. 2A and 2B, through-holes for the terminals 43 and 49, an inlet 62 for raw water, an outlet 60 for the acid water and an outlet 64 for the alkali water on a bottom face, and further has an inner cylinder section 54, through which a pipe 56 for the acid water connected to the outlet 60 runs.

The electrodes E are provided between an outer circumferential face of the inner cylinder section 54 of the lower casing section 58 and an inner circumferential face of the outer casing section 52. The electrodes E are, as shown in FIGS. 3A and 3B, concentrical three cylindrical electrodes.

Figure 3A:
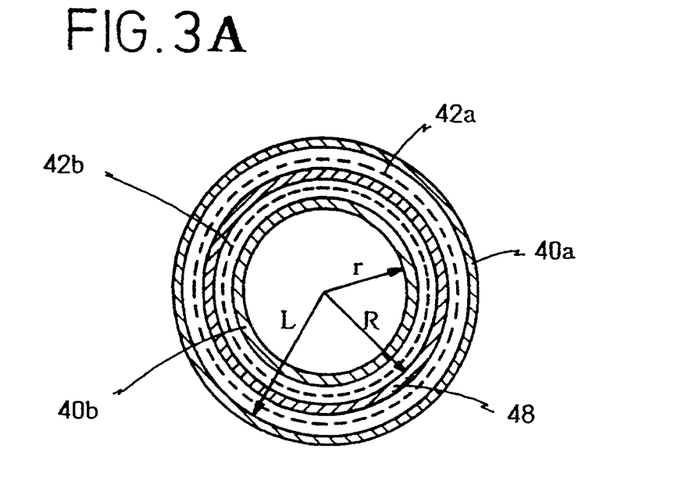
FIG. 3A is a transverse sectional view of the electrodes assembled in the electrolyzing tank 32 shown in FIG. 2.
Figure 3B:
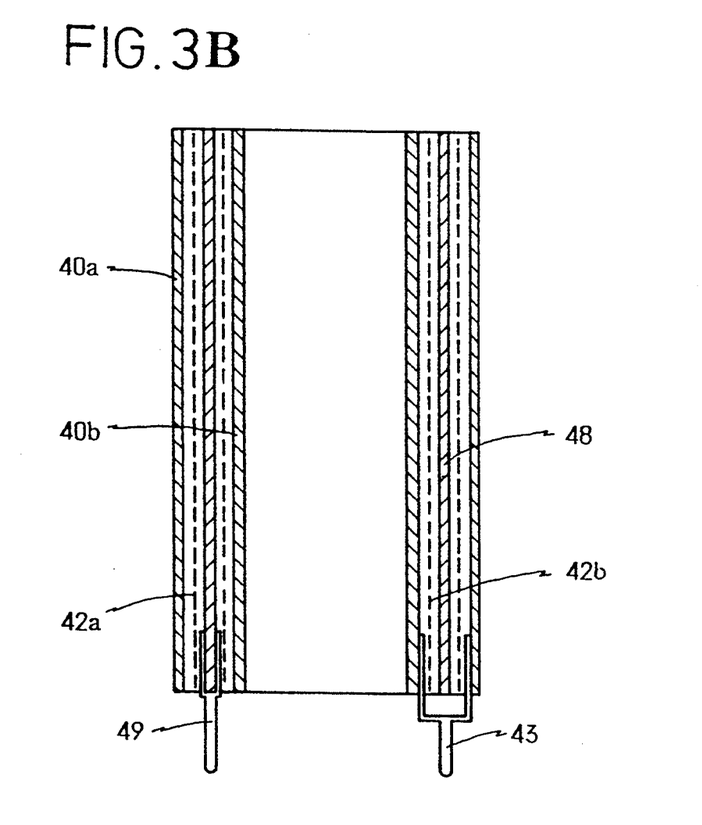
FIG. 3B is a longitudinal sectional view of the electrodes assembled in the electrolyzing tank 32 shown in FIG. 2.

In the cylindrical electrodes, as shown in FIGS. 3A and 3B, there is provided an anode electrode 48 between cathode electrodes 40a and 40b, and porous partitions 42a and 42b are provided therebetween. The anode electrode 48 is a cylindrical body made of titanium (Ti) and coated with platinum (Pt). By using such a cylindrical body as the anode electrode 48, the frequency of replacing the anode electrode 48 can be lower.

Note that, deterioration speed of the cathode electrodes 40a and 40b is slower than that of the anode electrode 48, so it may be made of stainless steel.

DC voltage will be inputted to the terminals 43 and 49, which are provided on the end faces of the cathode electrodes 40a and 40b and the anode electrode 48.

Figure 4A:
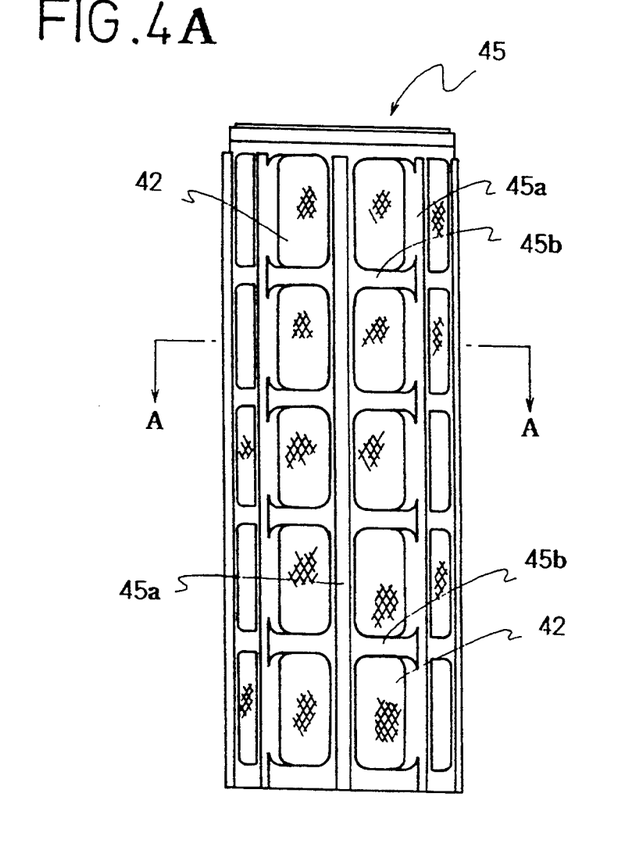
FIG. 4A is a front view of partitions 42a and 42b shown in FIG. 3.
Figure 4B:
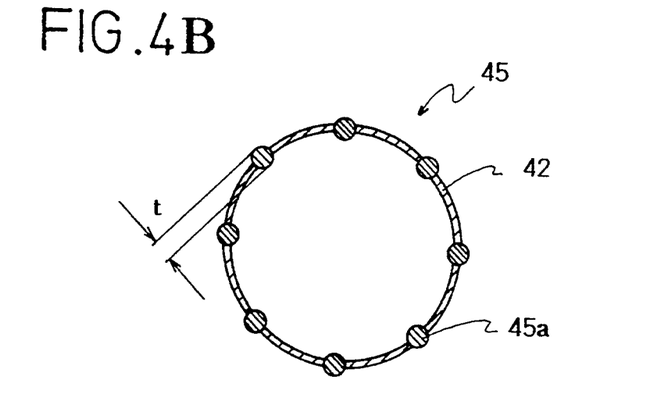
FIG. 4B is a sectional view of partitions 42a and 42b shown in FIG. 3.

Each partition 42a and 42b has a basket-like cylinder 45 made of a plastic and a polyester nonwoven fabric sheet 42, which is on the whole inner face of the basket-like cylinder 45.

The basket-like cylinder 45 has a plurality of vertical ribs 45a, which are vertically provided along edges of the cylinder 45, and a plurality of horizontal ribs 45b, which are provided in the circumferential direction. Each vertical rib 45a has, as shown in FIG. 4B which is a sectional view taken along line A—A in FIG. 4A, a circular sectional shape, and works as a spacer between the cathode electrodes 40a and 40b and the anode electrode 48.

Therefore, diameter t of the vertical rib 45a is equal to the clearance between the cathode electrodes 40a and 40b and the anode electrode 48.

In the electrodes 40a, 40b and 48 of the present embodiment shown in FIGS. 3A and 3B, the surface area of the anode electrode 48 is equal to the sum of the surface area of an inner circumferential face of the cathode electrode 40a, which faces an outer circumferential face of the anode electrode 48, and surface area of an outer circumferential face of the cathode electrode 40b, which faces an inner circumferential face of the anode electrode 48.

The relationship among the radii of the electrodes 40a, 40b and 48 is indicated by the following formula.

As shown in FIG. 3A, the radius of the cathode electrode 40a is r; the radius of the anode electrode 48 is R; and the radius of the cathode electrode 40b is L ($r < R < L$). If the thickness of the electrodes with respect to their radius is ignorable, the relationship is:

$$2 \times 2\pi R = 2\pi r + 2\pi L$$

$$R = (r + L)/2$$

When the purified water is introduced into the electrolyzing tank 32 whose electrodes have the above described relationship, it is electrolyzed between the inner circumferential face of the cathode electrode 40a and the outer circumferential face of the anode electrode 48, and between the outer circumferential face of the cathode electrode 40b and the inner circumferential face of the anode electrode 48.

During the electrolyzing, all circumferential faces of the anode electrode 48 work for electrolyzing, so electrolyzing efficiency can be maximum.

The acid water is produced among the partitions 42a and 42b and the anode electrode 48; the alkali water is produced between the partition 42a and the cathode electrode 40a and between the partition 42b and the cathode electrode 40b.

The alkali water and the acid water electrolyzed are branched by a branching plate, which is attached to an end section of the electrode E, then the alkali water is introduced out from the electrolyzing tank 32 via the pipe 16c, shown in FIG. 1, and the acid water is discharged via the pipe 16d.

Figure 5A:
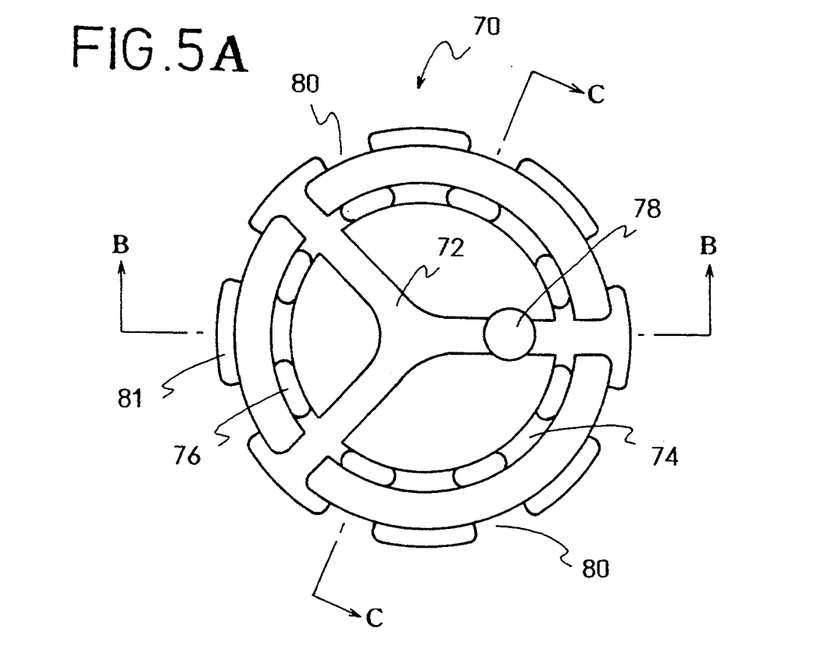
FIG. 5A is a plan view of a branching plate, which is assembled to one end of the electrodes.
Figure 5B:
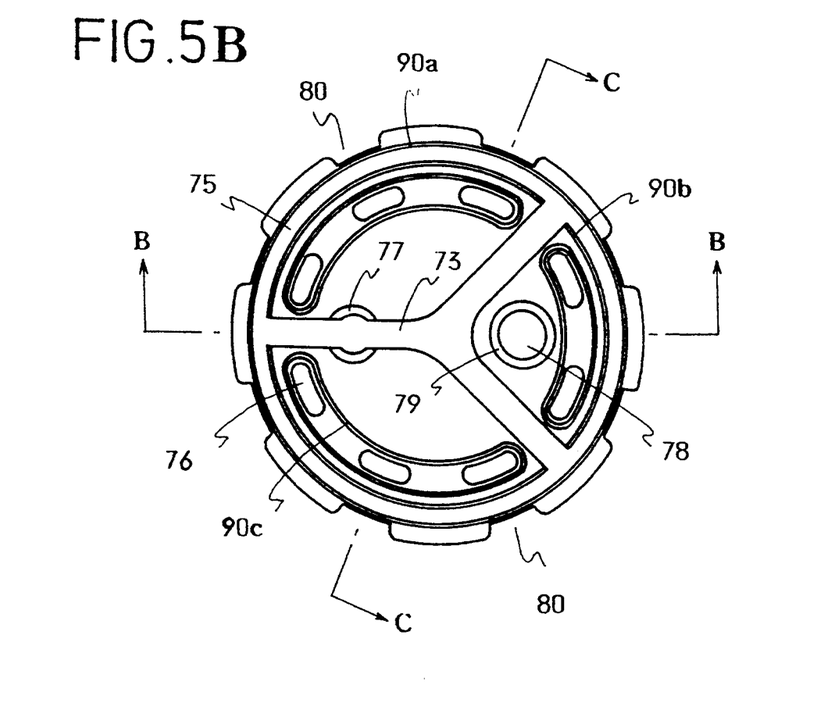
FIG. 5B is a bottom view of the branching plate assembled to one end of the electrodes.
Figure 6A:
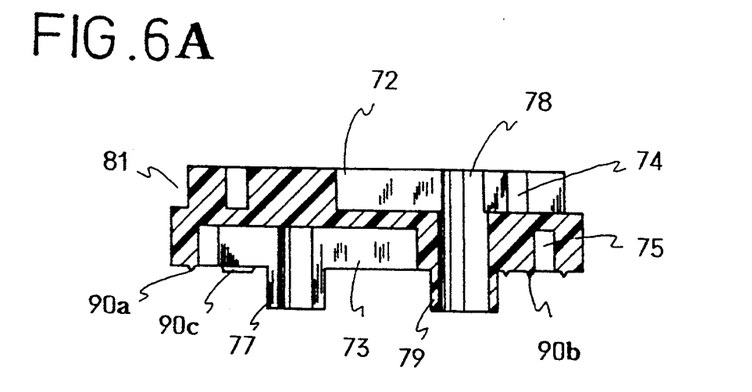
FIG. 6A is a sectional view of the branching plate shown in FIG. 5 taken along the line B—B.
Figure 6B:
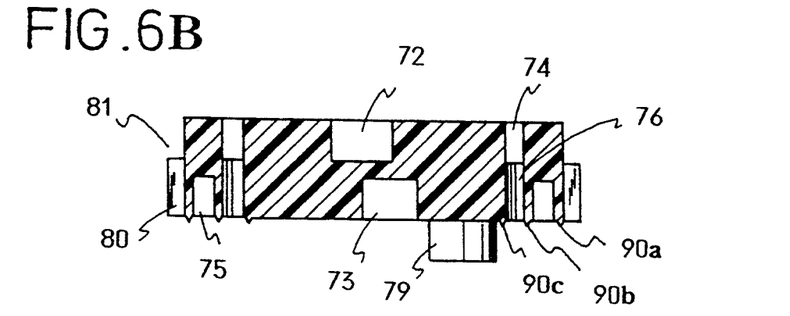
FIG. 6B is a sectional view of the branching plate shown in FIG. 5 taken along the line C—C.

A plan view of the branching plate 70, which is attached to the end section of the electrode E, is shown in FIG. 5A, and its rear view is shown in FIG. 5B. And a sectional view taken along line B—B of FIGS. 5A and 5B is shown in FIG. 6A, and a sectional view taken along line C—C is shown in FIG. 6B.

As shown in FIG. 5A, there is grooved a Y-groove having a through-hole 78 on a front face of the circular branching plate 70. And a front looped groove 74 having a plurality of oval through-holes 76 is arranged on outer edge side with respect to the through-hole 78 and across each branch section of the Y-groove 72.

There are grooved a plurality of vertical grooves 80 on a side face of the branching plate 70, and the vertical grooves 80 are connected to an L-groove 81 (see FIG. 6A), which contacts the Y-groove 72.

As shown in FIG. 5B, there is grooved an inverted Y-groove 73, which corresponds to the Y-groove 72 on the front face, on a rear face of the branching plate 70, and a rear looped groove 75, which contacts the inverted Y-groove 73, between the outer edge of the branching plate 70 and the oval through-holes 76. The inverted Y-groove 73 does not cross the through-hole 78 and the oval through-holes 76, and the through-hole 78 is connected to a short pipe section 79 (see FIGS. 6A and 6B), which is extended to a bottom face of the branching plate 70.

There is formed a short pipe section 77, whose opening section is opened along the inverted Y-groove 73, in the inverted Y-groove 73 (see FIG. 6A).

There are projected bosses 90a, 90b and 90c, which are arranged along side both edges of the rear looped groove 75 and the oval through-holes 76, on the rear face of the branching plate 70. The bosses 90a, 90b and 90c are capable of biting a packing 82, which is inserted between the end face of the electrode E and the branching plate 70 and which is made of an elastic material, e.g., rubber, so as to seal the rear looped groove 75 and the oval through-holes 76.

Figure 7:
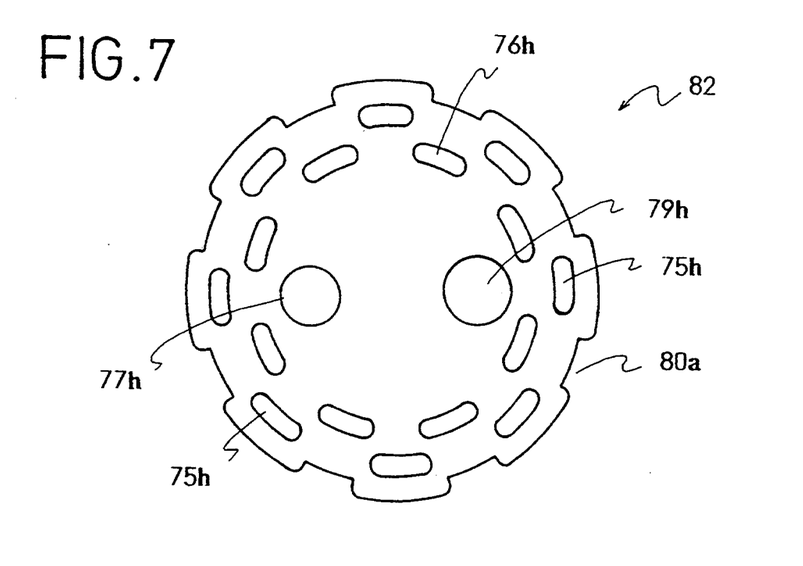
FIG. 7 is a front view of a packing.

FIG. 7 is a front view of the packing 82. The packing 82 has notches 80a, which correspond to the vertical grooves 80 on the branching plate 70, on an edge, and oval holes 76h, which correspond to the oval through-holes 76, are circularly arranged on an inner side of the notches 80a. There are circularly arranged oval holes 75h, which are connected to the rear looped groove 75, between the oval holes 76h and the notches 80a, and there are bored inserting holes 77h and 79h, into which the short pipe sections 77 and 79 are respectively inserted, inside of the circularly arranged oval holes 76h and 75h.

The packing 82 and the branching plate 70 are integrated to branch the alkali water and the acid water, which have electrolyzed by the electrode E.

Figure 8:
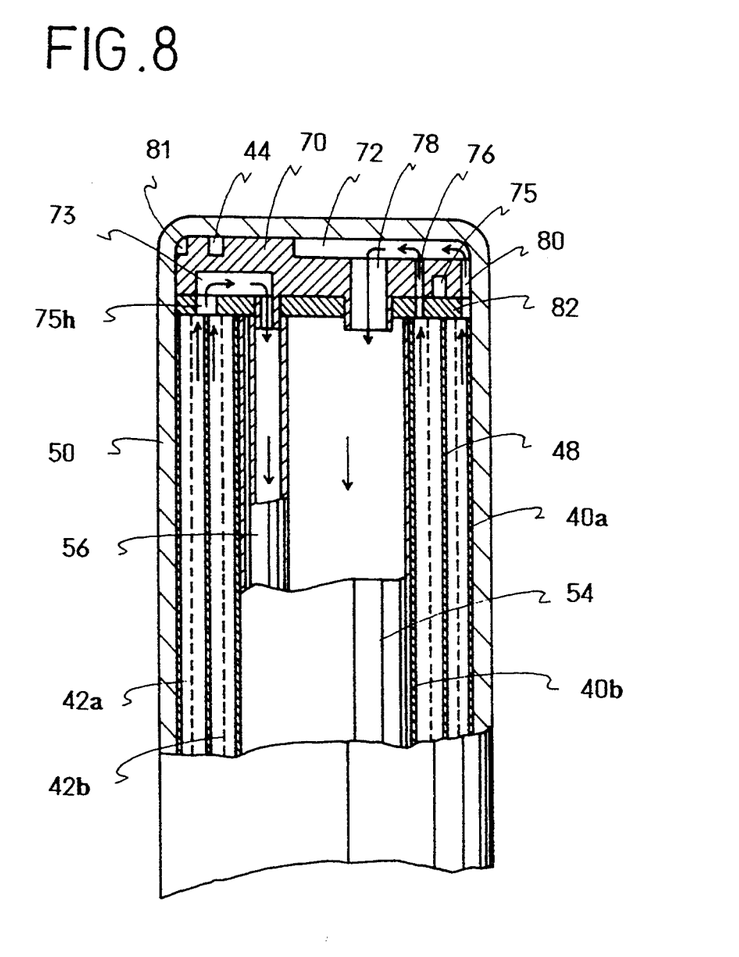
FIG. 8 is an explanation view showing a flow route of water in the electrolyzing tank.

In FIG. 8, the electrode E, which is having the packing 82 and the branching plate 70 on the end face, is accommodated in the tank casing 50. The raw water, which has been introduced into the tank casing 50 via the inlet 62 on the bottom face, climbs up in the electrode E and is electrolyzed. During electrolyzing, the raw water between the cathode electrode 40a and the partition 42a and between the cathode electrode 40b and the partition 42b will be the alkali water; the raw water between the anode electrode 48 and the partitions 42a and 42b will be the acid water.

The alkali water between the cathode electrode 40b and The partition 42b flows into the front looped groove 74 via the oval holes 76h of the packing 82 and the oval through-holes 76 of the branching plate 70. The alkali water between the cathode electrode 40a and the partition 42a flows into the L-groove 81 via the notches 80a of the packing 82 and the vertical grooves 80 of the branching plate 70. The alkali water in the front looped groove 74 and the L-groove 81 further flows into the Y-groove 72, which is connected to the front looped groove 74 and the L-groove 81, and the inner cylinder section 54 via the through-hole 78 and the short pipe section 79. The alkali water concentrated in the inner cylinder section 54 is introduced out from the outlet 64, which is provided on the bottom face of the tank casing 50.

On the other hand, the acid water between the anode electrode 48 and the partitions 42a and 42b flows into the inverted Y-groove 73 via the oval holes 75h of the packing 82, the rear looped groove 75 of the branching plate 70.

The acid water in the inverted Y-groove 73 is introduced out from the outlet 60, which is provided on the bottom face of the tank casing 50, via the short pipe section 77 and the pipe 56 in the inner cylinder section 54.

In the present embodiment, the electrode E, the packing 82 and the branching plate 70 are integrally accommodated in the tank casing 50, and the terminals 43 and 49, the inlet 62 for the raw water, the outlet 60 for the acid water and the outlet 64 for the alkali water are provided on the bottom face of the tank casing 50, thus the electrolyzing tank can be attached to and detached from the water electrolyzer in one action, so that the electrolyzing tank can be exchanged quite easily.

In the above described embodiment, the partitions 42a and 42b shown in FIGS. 3A and 3B are made of polyester non woven fabric and held by the basket-like cylinder 45 shown in FIG. 4A. The basket-like cylinder 45 has the vertical ribs 45a and the horizontal ribs 45b.

The vertical ribs 45a also work as spacers between the cathode electrode 40a or 40b and the anode electrode 48, so that the water flows along the vertical ribs 45.

The raw water stays in the electrodes for longer, the electrolyzing efficiency will be higher because the raw water is capable of contact with the electrodes for a long time. Thus, it is preferable to use the cylindrical body, such as the basket-like cylinder 45 shown in FIG. 9.

Figure 9:
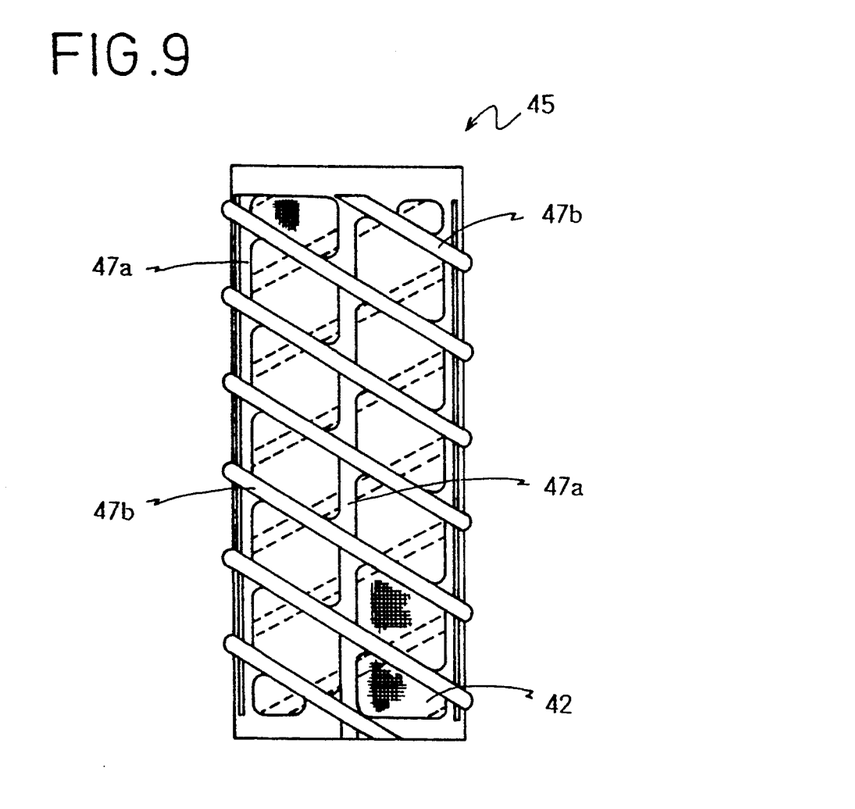
FIG. 9 is a front view showing another embodiment.

The basket-like cylinder 45 shown in FIG. 9 has a plurality of vertical ribs 47a and a plurality of spiral ribs 47b, which cross the vertical ribs with a predetermined angle. The spiral ribs 47b work as spacers between each cathode electrode 40a or 40b and the anode electrode 48, so that the water flows along the spiral ribs 47b during electrolyzing.

By above described function, the basket-like cylinder 45 shown in FIG. 9, in comparison with the basket-like cylinder 45 shown in FIG. 4A, makes the water possible to stay in the electrode longer, and the electrolyzing efficiency will be higher.

Note that, in FIG. 9, a polyester nonwoven fabric sheet is sticked on a whole inner face of the basket-like cylinder 45 as the partition 42.

In the above described embodiment, a cylindrical electrode made of titanium (Ti) and coated with platinum (Pt) is used as the anode electrode but it, of course, may be used as the cathode electrodes.

And there is provided one cylindrical anode electrode between two cylindrical cathode electrodes in the embodiment but one cylindrical cathode electrode between two cylindrical anode electrodes, furthermore four or more cylilndrical electrodes may be concentrically arranged.

In the water electrolyzer in the present invention, the electrolyzing tank and the water electrolyzer can be smaller in size.

Furthermore, the smaller electrolyzing tank can be easily replaced, so that maintenace work can be simplified.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. In a water electrolyzer comprising an electrolyzing tank, electrodes, which are mutually faced in said electrolyzing tank, and a porous partition provided between said electrodes, whereby alkali water is introduced from a cathode of said electrodes, characterized in that:

said electrodes are a first cylindrical electrode, a second cylindrical electrode which is concentrically arranged outside of said first cylindrical electrode, and a third cylindrical electrode which is concentrically arranged outside of said second cylindrical electrode; one of said adjacent cylindrical electrodes is a cathode and the other is an anode; and the surface area of said second cylindrical electrode is equal to the sum of the surface area of an outer face of said first cylindrical electrode and surface area of an inner face of said third cylindrical electrode; wherein said anode electrode is made of titanium (Ti) and coated with platinum (Pt).

2. The water electrolyzer according to claim 1, wherein said first and said third electrodes are cathodes, and said second electrode is an anode.

3. In a water electrolyzer comprising an electrolyzing tank, electrodes, which are mutually faced in said electrolyzing tank, and a porous partition provided between said electrodes, whereby alkali water is introduced from a cathode of said electrodes, characterized in that:

said electrodes are three cylindrical electrodes, which are concentrically arranged, one of adjacent cylindrical electrodes is a cathode and the other is an anode, each cylindrical electrode has a terminal on one end face, said partition is a cylindrical partition and concetrically arranged between adjacent cylindrical electrodes;

a branching plate for branching alkali water, which is formed on the cathode side, and acid water, which is formed on the anode side, to predetermined paths contacts the other end faces of said cylindrical electrodes with a packing made of an elastic material; and said electrolyzing tank has a tank casing, which is capable of accommodating said cylindrical electrodes, said cylindrical partitions and said branching plate, said tank casing has outlets for the alkali water and acid water, an inlet for raw water and through-holes, through which said terminals pass, on same face, said electrolyzing tank is detachably attached.

4. The water electrolyzer according to claim 3, wherein said cylindrical electrodes are a first cylindrical electrode, a second cylindrical electrode which is concentrically arranged outside of said first cylindrical electrode, and a third cylindrical electrode which is concentrically arranged outside of said second cylindrical electrode, one of said adjacent cylindrical electrodes is a cathode and the other is an anode, surface area of said second cylindrical electrode is equal to the sum of surface area of an outer face of said first cylindrical electrode and surface area of an inner face of said third cylindrical electrodes.

5. The water electrolyzer according to claim 3, wherein said first and third electrodes are cathodes, and said second electrode is an anode.

6. The water electrolyzer according to claim 3, wherein said anode electrode is made of titanium (Ti) and coated with platinum (Pt).

7. The water electrolyzer according to claim 3, wherein said branching plate has groove paths, which is connected to the paths, through which the alkali water and acid water pass, on faces, which contact said tank casing and said packing.

8. The water electrolyzer according to claim 3, wherein said outlets for the alkali water and acid water, said inlet for raw water and said through-holes, through which said terminals pass, are formed on a bottom face of said electrolyzing tank.

* * * * *